United States Patent [19]

Williams et al.

[11] Patent Number: 5,216,704
[45] Date of Patent: Jun. 1, 1993

[54] METHOD FOR REMOTE POWER FAIL DETECTION AND MAINTAINING CONTINUOUS OPERATION FOR DATA AND VOICE DEVICES OPERATING OVER LOCAL LOOPS

[75] Inventors: Arthur B. Williams, Smithtown; David T. Lundquist, Stony Brook, both of N.Y.

[73] Assignee: Coherent Communications Systems Corp., Hauppauge, N.Y.

[21] Appl. No.: 713,824

[22] Filed: Jun. 12, 1991

[51] Int. Cl.$^5$ .......................................... H04M 11/00
[52] U.S. Cl. ....................................... 379/93; 379/94; 379/387; 379/413; 370/110.1
[58] Field of Search ....................... 379/94, 2, 93, 387, 379/413; 370/110.1

[56] References Cited

U.S. PATENT DOCUMENTS

| | | |
|---|---|---|
| 2,572,027 | 10/1951 | Horwitz . |
| 3,715,503 | 2/1973 | Jungbluth et al. . |
| 3,983,340 | 9/1975 | Lima et al. . |
| 4,076,961 | 2/1978 | Holsinger et al. . |
| 4,575,584 | 3/1986 | Smith et al. . |
| 4,685,129 | 8/1987 | Gavrilovich .................. 379/413 |
| 4,797,874 | 1/1989 | Chahabadi et al. .............. 379/2 |
| 4,853,949 | 8/1989 | Schorr et al. .................. 379/2 |
| 4,984,267 | 1/1991 | Martinez ...................... 379/413 |
| 5,034,948 | 7/1991 | Mizutani et al. ............... 379/94 |

Primary Examiner—James L. Dwyer
Assistant Examiner—Wing F. Chan
Attorney, Agent, or Firm—Eckert Seamans Cherin & Mellott

[57] ABSTRACT

First and second ISDN modems are disposed at a subscriber location and telephone system central office and are arranged to operate in a normal mode, and in a bypass mode upon power failure at the subscriber location. The modems are coupled through the telephone lines via interface transformers having centertaps. The centertap at the subscriber location is split and coupled to a sealing current source and that at the central office is coupled to a sealing current detector and ground. Sealing current flows between the respective transformers during normal operation. A drop in sealing current due to subscriber power failure is sensed at the central office, causing local logic to bypass the central office interface transformer and to couple the central office voice switch directly to the telephone lines. Loop current detectors at the subscriber location and at the central office determine whether the subscriber location voice telephone device is on-hook. If power is restored when on-hook, the local logic recouples the output interface transformer to the telephone lines and the voice telephone device is recoupled to the modem. At the same time, the central office detects whether sealing current has been restored and whether the subscriber voice device is on-hook, and recouples its output interface transformer to the telephone lines and the voice switch to the input interface of the central office modem, resulting in restoration of normal operation.

10 Claims, 5 Drawing Sheets

METHOD FOR REMOTE POWER FAIL DETECTION AND MAINTAINING CONTINUOUS OPERATION FOR DATA AND VOICE DEVICES OPERATING OVER LOCAL LOOPS

BACKGROUND OF THE INVENTION

1. Field of the Invention

This invention relates to the field of data and voice communications and more particularly to a method and system for maintaining voice communication in an ISDN type modem system during power fail conditions.

2. Prior Art

ISDN modems are a known means of combining voice and data communication over telephone lines. ISDN (for "Integrated Services Digital Network") modems are primarily digital devices which convert analog voice signals to digital data packets which are combined with other digital information data packets for communication over conventional telephone lines. Since ISDN modems transmit and receive voice signals via digital means, in many systems, voice communication becomes impossible when power is lost at a subscriber location.

Prior systems have been developed to provide fail-safe voice communication when power is lost at a subscriber location. For example, in a digital communication system described in U.S. Pat. No. 4,853,949—Schorr et al., telephone system central office circuitry monitors loop current, loop DC continuity, incoming ringing from the telephone system central office switch and synchronization between the various digital devices in the system. Under normal conditions, the respective digital devices are in an idle state. In this state, although handshaking signals are exchanged, no voice or data link is established. When the subscriber location telephone device(s) go off-hook, the respective digital transceivers in the system become active and a full transmission path is established. Alternatively, if an incoming ringing signal is detected at the telephone system central office from the central office switch, the respective digital transceivers also become active. Under normal conditions, no DC path between the respective digital transceivers is established.

When a power failure occurs at the subscriber location during a telephone call, a relay at the subscriber location bypasses the digital transceiver and the telephone device is directly coupled to the telephone line. As a result the telephone system central office digital transceiver loses synchronization. A DC continuity path is detected, and a relay connects the incoming loop directly to the telephone system central office switch.

If a power failure occurs during an idle state of the telephone device, DC continuity is not detected. Thus, the telephone system central office does not go into a bypass mode. If the telephone device subsequently goes off-hook during a power failure, the telephone system central office equipment senses the DC continuity and bypasses the telephone system central office digital transceiver, therefore connecting the subscriber telephone device to the central office switch.

During a power failure, and with the telephone device in an idle state, incoming ringing at the central office activates a ringing detector which will then instruct the telephone system central office digital transceiver to send a "wake-up" signal to the subscriber location transceiver. In this state, the subscriber location digital transceiver cannot respond, eventually causing the telephone system central office digital transceiver to "time-out", thus bypassing the telephone system central office digital transceiver and passing the ringing signal directly to the subscriber location. The subscriber location telephone then rings. If the subscriber location telephone device goes on-hook during a power fail mode, DC continuity will cease so the telephone system central office transceiver will no longer be bypassed.

During the idle state of the telephone, restoration of power at the subscriber location immediately activates a local relay, thus eliminating the bypass of the subscriber location transceiver. The telephone system central office digital transceiver remains connected in the idle state.

If power is restored during a voice call, the bypass relay at the subscriber location is immediately activated, thus connecting the local transceiver which interrupts the loop current which is then sensed at the telephone system central office by the loop current detector. A bypass relay at the telephone system central office then changes state so that the telephone system central office digital transceiver is no longer bypassed. The telephone system central office digital transceiver then sends a "wake-up" signal to the digital transceiver at the subscriber location in an attempt to re-synchronize the link.

While achieving its stated purpose, the above described system has several problems. A standard requirement for local loop systems is to provide a DC sealing current to the loop. In the absence of sealing current, a poorly-conducting oxide film will develop over a period of time at the various non-soldered wire splices used in the system. A sealing current in the range of 10 mA is used to prevent oxidation and maintain low resistance across the non-soldered connections. The fact that the system of Schorr et al. relies upon a lack of DC continuity during normal operation, prevents the introduction of beneficial sealing current. This violates ISDN standards as well as normal practice.

Further, in the system of Schorr et al., if power is restored during a voice call, the subscriber location bypass relay will immediately be activated and cause a current interruption by breaking the direct path over the local loop. Any momentary open-loop condition will be very disruptive and most likely results in a lost call.

In another system, described in U.S. Pat. No. 4,575,584—Smith et al., a combined digital and analog telephone is normally connected to a digital telephone exchange (PBX) and operates in a digital mode. In the event of a power failure or a telephone exchange malfunction, the digital telephone is converted to an analog mode, is disconnected from the digital telephone exchange (PBX), and is connected to a local analog telephone line. When power is restored, the telephone reverts to a digital mode and is recoupled to the digital telephone exchange. While this system also provides a degree of fail safe operation, the system is complicated, requiring both digital and analog telephone connections for operation.

In view of the foregoing, no system is known for detecting power failure at a remote subscriber location having a digital multiplexer/modem and an associated analog telephone device wherein upon detection of a remote power failure, the respective digital circuitry of the system is bypassed and the remote analog telephone is coupled directly to the telephone system central office over an analog local loop. No prior system monitors power status of a remote subscriber location at the telephone system central office for the purpose of restoring normal operation when power has returned.

SUMMARY AND OBJECTS OF THE INVENTION

In summary, the present invention contemplates a method and system for maintaining voice communication in an ISDN modem system during power failure conditions. The present invention includes first and second ISDN modems disposed at a subscriber location and telephone system central office, respectively, wherein the subscriber location ISDN modem includes input interfaces coupled to a voice telephone device and a data terminal and the telephone system central office location ISDN modem includes input interfaces coupled to a voice switch and a data processing device. The respective ISDN modems are coupled to conventional telephone lines with interface transformers having centertap terminals. The split centertap terminals of the subscriber location interface transformer is coupled to a sealing current source and the centertap terminal of the telephone system central office location interface transformer is coupled to ground through a sealing current detector such that a sealing current flows between the respective transformers during normal operation. If a power failure occurs at the subscriber location, the subscriber location voice telephone device is coupled directly to the telephone lines, and the current interface transformer is decoupled from the telephone lines by a local logic circuit, resulting in a drop in the flow of sealing current. The drop in sealing current is remotely sensed at the telephone system central office, causing local logic to bypass the telephone system central office interface transformer and to couple the voice switch directly to the telephone lines. Loop current detectors at the subscriber location and the telephone system central office monitor the system to determine when the subscriber location voice telephone device is on-hook. If power is restored at the subscriber location and if the voice telephone device is on-hook, the local logic circuit recouples the output interface transformer to the telephone lines and the voice telephone device is recoupled to the input interface of the subscriber location ISDN modem. At the same time, the telephone system central office detects whether sealing current has been restored and whether the subscriber location voice telephone device is on-hook. When this condition is detected, the output interface transformer of the telephone system central office is recoupled to the telephone lines and the voice switch is recoupled to the input interface of the telephone system central office ISDN modem resulting in a restoration of normal system operation.

Accordingly, it is an object of the present invention to provide a method and system for maintaining voice communication in a voice and data communications system during power fail conditions.

It is another object of the present invention to provide a fault tolerant voice and data communications system which does not rely on power supplied from a telephone system central office.

It is still another object of the present invention to provide the advantages of a remotely powered voice and data communications system without requiring hazardous voltages on the communication lines which couple the respective communication terminal sites.

BRIEF DESCRIPTION OF THE DRAWINGS

The accomplishment of these and other objects may be fully understood through the following detailed description of an exemplary embodiment and the accompanying drawings, in which.

DETAILED DESCRIPTION OF THE PREFERRED EMBODIMENTS

Figure 1A:
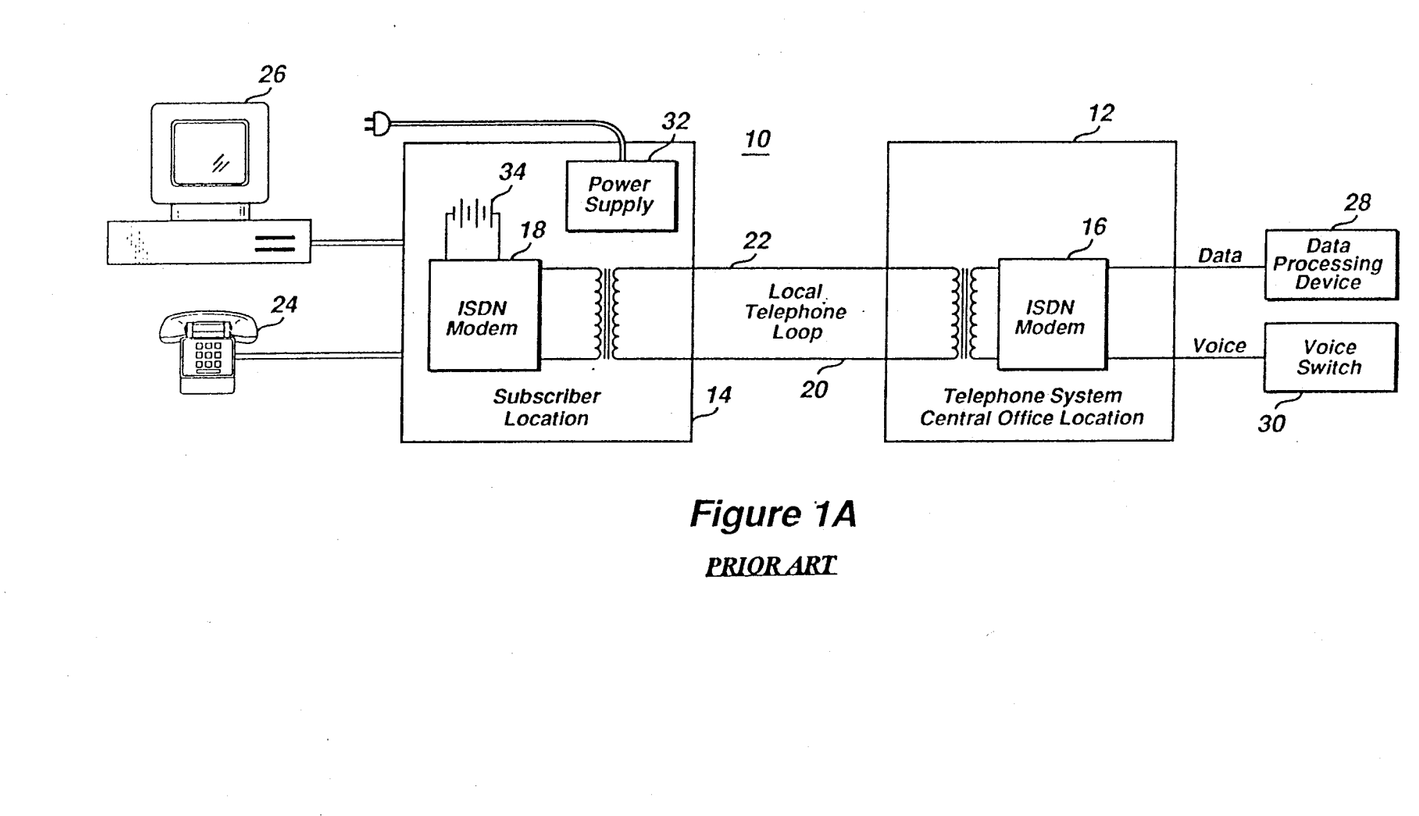
FIG. 1A is a block diagram of one type of prior art ISDN modem system incorporating a local power feed at a subscriber site.

ISDN modems are a known means for providing digital voice and information data communications over conventional telephone lines. Typically, ISDN type subscriber modems digitize voice signals originating from an analog voice telephone device and combine the digitized voice signals with information data for transmission to a telephone system central office. Conversely, ISDN modems convert received data signals to analog voice signals and information data signals processed by local voice telephone devices and local data terminals. Since the voice transmission is digital, the conversion of an analog voice signal to a digital form, and vice versa, depends on the respective modems used at the subscriber location and the telephone system central office. Accordingly, voice telephone operation ceases when system power is lost. There are currently two basic methods for providing power for remote customer sites using ISDN type equipment. These methods are referred to as Local and Phantom feeds and are shown in block diagram form in FIGS. 1A and 1B, respectively. Referring now to FIG. 1A, the local feed method is relatively simple and cost effective. One disadvantage in this type of system is that with loss of local power, telephone operation is completely interrupted, including voice operation. In the system 10, a telephone system central office 12 communicates with a subscriber location 14 through ISDN modems 16, 18 which are coupled via conventional telephone lines 20, 22. At the subscriber location 14, a conventional telephone 24 and a data terminal or processing device 26 are interfaced to ISDN modem 18 wherein ISDN modem 18 converts the analog voice signal generated by telephone 24 to a digital signal which is combined with the information data signal used by data terminal or processing device 26. The central office ISDN modem 16 is coupled to conventional data processing means 28 and a conventional voice switch 30 wherein ISDN modem 16 converts the digital voice signal generated by ISDN modem 18 to a analog voice signal processed by voice switch 30 and to the information data signal processed by processing device 28. In this system configuration, power for the ISDN modem 18 at the subscriber location 14 is provided by a local power supply 32 which is assisted by a conventional battery backup system 34. As noted above, one disadvantage for this type of system is the fact that under power fail conditions, communications for the entire system are interrupted. The battery backup system 34 provides some protection in this situation but storage batteries require periodic maintenance and have a finite life. In addition, storage batteries are expensive and the battery backup system 34 typically requires a DC to DC converter to generate the operating voltages required by the ISDN modem circuitry. An uninterruptable power supply may be substituted for the battery backup system but these types of power supplies are expensive and also require periodic maintenance. However, this system configuration is relatively simple to implement and does not require potentially hazardous voltages to appear on telephone lines 22, 20.

Figure 1B:
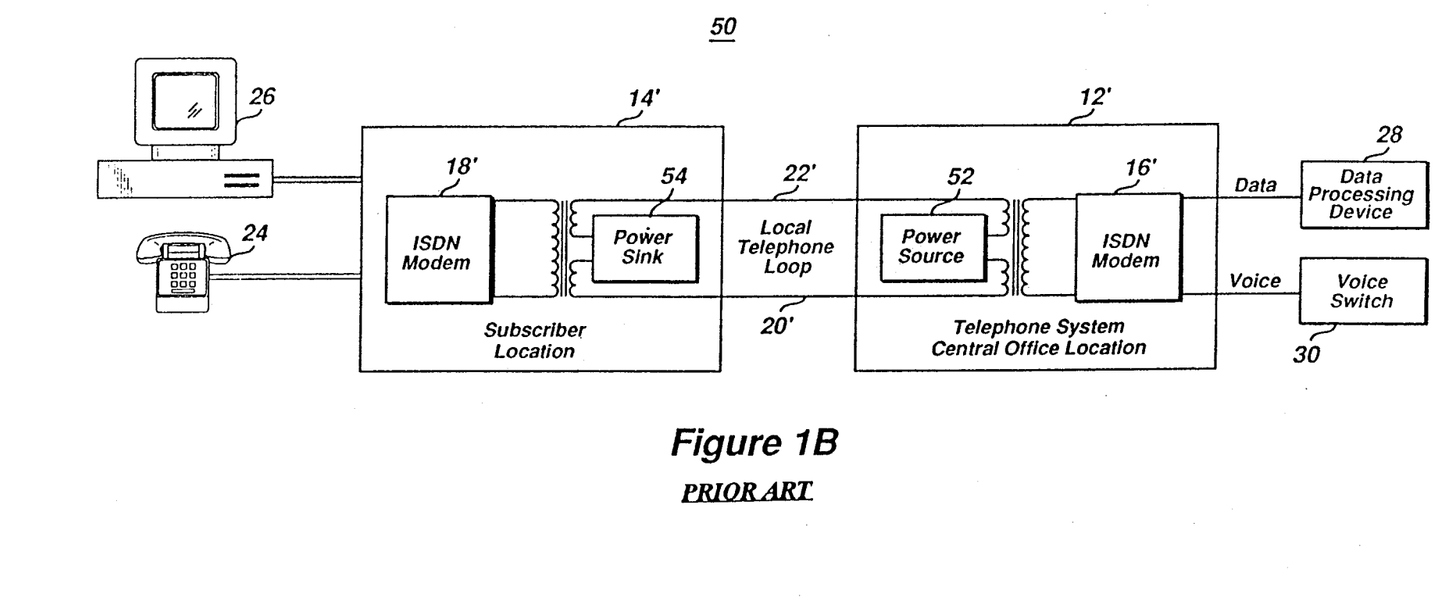
FIG. 1B is a block diagram of another type of prior art ISDN modem system incorporating a phantom power feed from a telephone system central office.

Another type of conventional ISDN modem system is the phantom power feed system 50 as shown in FIG. 1B. For the sake of clarity, devices which perform identical functions as the devices shown in FIG. 1A bear identical designations. In the system 50, power for the ISDN modem 10' is provided by the central office 12' via telephone lines 20' and 22'. Specifically, a power source 52, located in central office 12' is coupled to power sink circuitry 54 located at the subscriber location 14'. This system configuration relies on the fact that even in the event of a power failure at the subscriber location 14', the telephone system central office 12' is always powered from either a local battery, the local AC main power supply or an uninterruptable power supply (not shown). The telephone lines 20', 22' furnish power from the telephone system central office 12' to the subscriber location 14'. In order to provide sufficient power to the subscriber location 14', and to overcome the resistance of the local loop (coupled via telephone lines 20', 22), voltages as high as 140V DC must be generated by the telephone system central office 12'. In addition, a DC-DC converter (not shown) is required at the subscriber location 14' to generate the various voltages required to operate ISDN modem 18'. This system configuration is both costly and inefficient. Typically, only 25% of the power provided at the telephone system central office 12' is actually delivered to the ISDN modem 18' due to the inherent resistance of telephone lines 22', 20'. Furthermore, the 140 volt voltage present on telephone lines 22', 20' may be considered hazardous in many situations. Accordingly, this type of system configuration is not preferred.

Figure 2:
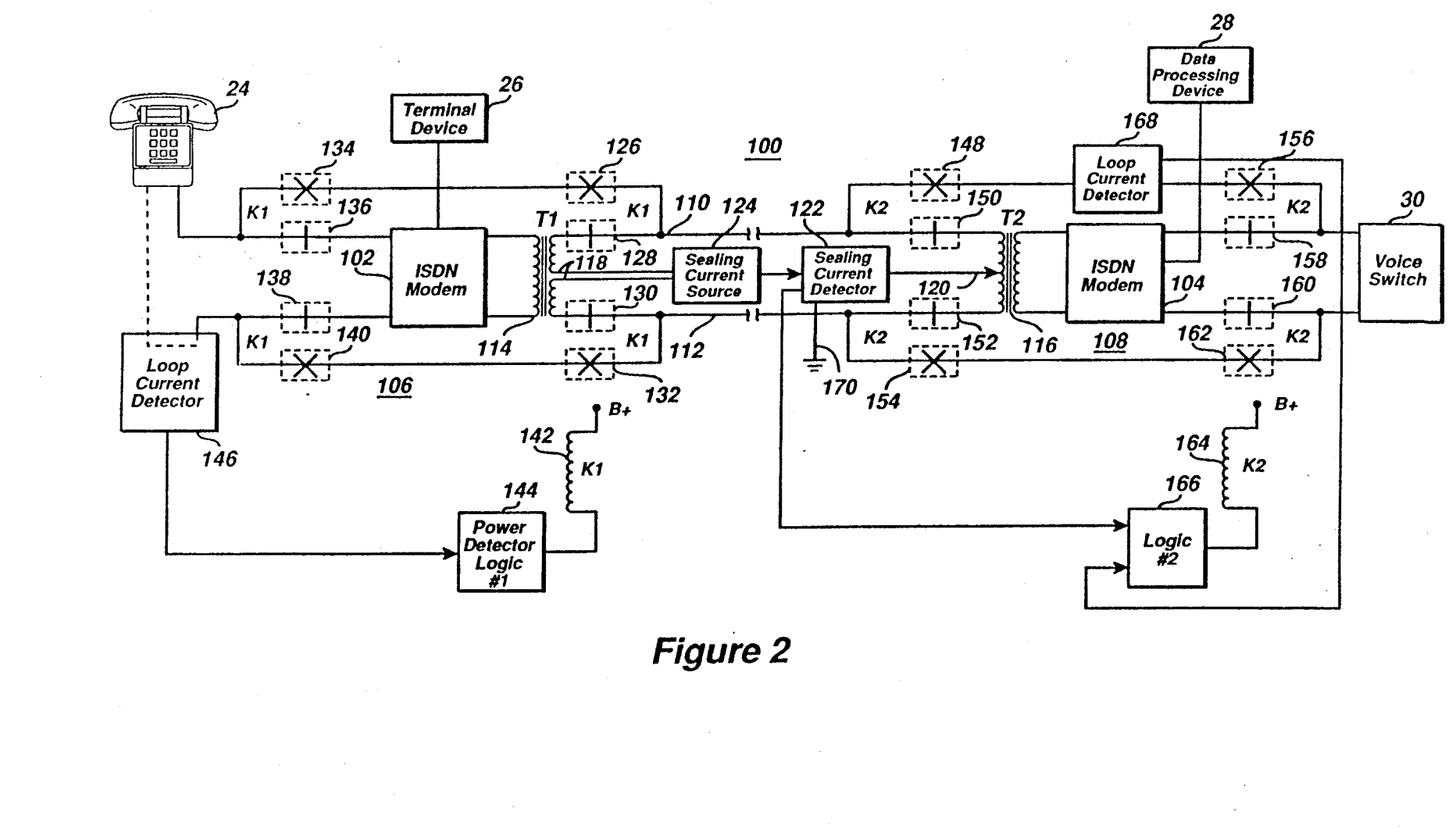
FIG. 2 is a block diagram of the preferred embodiment of the present invention.

Referring now to FIG. 2, the preferred embodiment of the present invention is shown in block diagram form. The present invention provides all the advantages of the system described in conjunction with FIG. 1A while also eliminating the problems which occur during power fail conditions. In the system 100, conventional ISDN modems 102, 104 are employed at the subscriber site 106 and the telephone system central site 108, receptively. As in the systems described above, the subscriber location ISDN modem 102 is interfaced to an analog voice telephone device 24 and some type of data terminal device 26. The telephone system central office ISDN modem 104 is interfaced to a data processing device 28 and a conventional voice switch 30. In the preferred practice of the present invention, ISDN modems 102, 104 are interfaced to telephone lines 110, 112 through transformers 114, 116, respectively. Each of respective transformers 114, 116 are provided with centertap type terminals 118, 120, wherein split centertap terminal 118 is coupled to a sealing current source 124 and centertap terminal 120 is coupled to sealing current detector 122. Sealing current detector 122 is connected to ground 170.

The subscriber location 106 equipment is coupled to telephone lines 110, 12 through a plurality of switches 126-132 which are configured as a conventional multipole, single-throw relay contacts which are controlled by relay coil 142. Relay coil 142 is selectively energized by subscriber location logic circuitry 144. The detailed operation of subscriber location logic circuitry 144 is discussed in detail below in conjunction with FIG. 4A. In the preferred practice of the present invention, switches 126, 132, 134, and 140 are normally open and switches 128, 130, 136 and 138 are normally closed. As shown in FIG. 2, telephone lines 110, 112 are coupled to transformer 114 through switches 128, 130, respectively. Telephone 24 has one terminal coupled to ISDN modem 102 through switch 136. This terminal of telephone 24 may also be coupled directly to telephone line 110 through switches 126, 134. The other terminal of telephone 24 may be coupled to ISDN modem 102 through conventional loop current detector 146 and switch 138. The output of loop current detector 146 may also be coupled directly to telephone line 112 through switches 132, 140. Switches 134-140 are also configured as conventional multi-pole, single-throw relay contacts which are controlled by relay coil 142. Loop current detector 146 also has a logic output coupled to subscriber location control logic 144 wherein the logic output of loop current detector indicates whether telephone device 24 is off-hook.

The telephone system central office location 108 equipment is coupled to telephone lines 110, 112 through a plurality of switches 148-162 which are configured as a conventional multi-pole, single-throw relay contacts which are controlled by relay coil 164. Relay coil 164 is selectively energized by telephone system central office location logic circuitry 166. The detailed operation of telephone central office location logic circuitry 166 is discussed in detail below in conjunction with FIG. 4B. In the preferred practice of the present location, switches 148, 154, 156 and 162 are normally open and switches 150, 152, 158 and 160 are normally closed. As shown in FIG. 2, telephone lines 110, 112 are coupled to transformer 116 through switches 150, 152, respectively. Voice switch 30 has one terminal coupled to ISDN modem 104 through switch 158. This terminal of voice switch 30 may also be coupled directly to telephone line 110 through switch 156, loop current detector 168 and switch 148. The other terminal of voice switch 30 may be coupled to ISDN modem 104 through switch 160, or may be coupled directly to telephone line 112 through switches 154, 162. Loop current detector 168 also has a logic output coupled to telephone system central office logic 166 wherein the logic output of loop current detector 168 indicates whether the telephone device 24 is off-hook.

Each of the respective switches 126-140 and 148-162 are shown in their normal state wherein relay coils 142, 164 are energized. In this state, the ISDN modems are coupled via telephone lines 110, 112 through transformers 114, 116. Sealing current flows from sealing current source 124, and transformer 114 to the centertap terminal 120 of transformer 116 to sealing current detector 122 and ground 170. The respective ISDN modems 102, 104 function normally and telephone device 24 and terminal device 26 communicate with the telephone system central office 108 via the conventional ISDN protocol, as controlled by modems 102, 104.

The system 100 of the present invention provides continuous voice telephone operation in situations wherein power is lost as the subscriber location 106, although the system 100 could also be arranged to accommodate situations wherein power is lost at either the subscriber location 106, or the telephone system central office 108. The detailed operation of the system 100 may be fully understood by referring to FIGS. 2, 4A and 4B. The logic circuits 144, 166 may be of a variety of conventional types such as combinational logic circuits or microprocessors operating in accordance with the routines shown in FIGS. 4A and 4B. When the logic circuits 144 and 166 are initialized, the respective relays 142, 164 are energized, as represented by steps 402 and 452, thus placing the respective switches 126-140 and 148-162 in the position shown in FIG. 2. A power fail condition at the subscriber location 106 is detected at decision 404 by subscriber location logic 144. As soon as a power fail condition occurs, relay 142 is de-energized at step 406. This causes telephone device 24 to be coupled directly to telephone lines 110, 112 through switches 126, 134 and through loop current detector 146 and switches 132, 140, respectively. In this state, ISDN modem 102 and terminal device 26 ar switched out of the system. However, since power is temporarily not available at the subscriber location 106, this change is inconsequential.

Figure 4A:
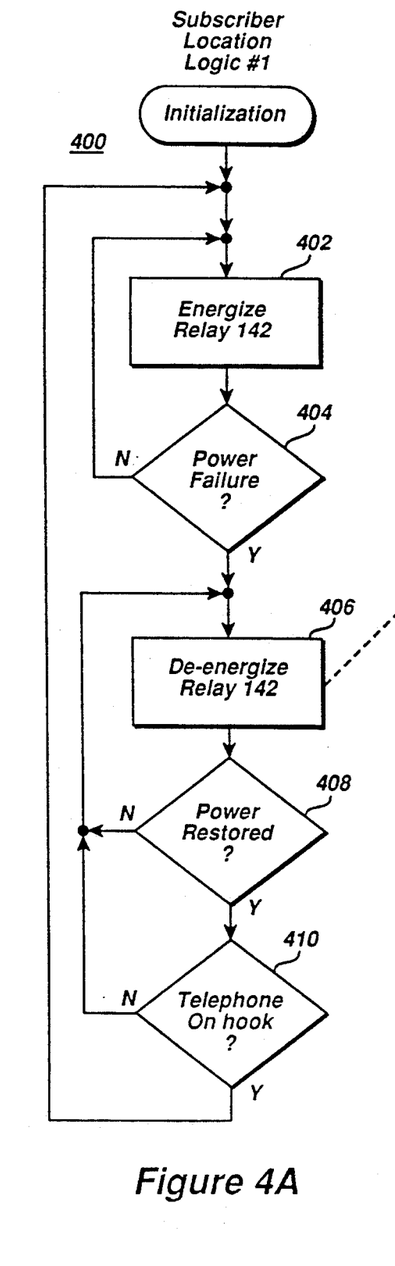
FIGS. 4A and 4B are flow diagrams detailing the operation of the logic circuits which control the operation of the subscriber location equipment and the telephone system central office equipment, respectively.
Figure 4B:
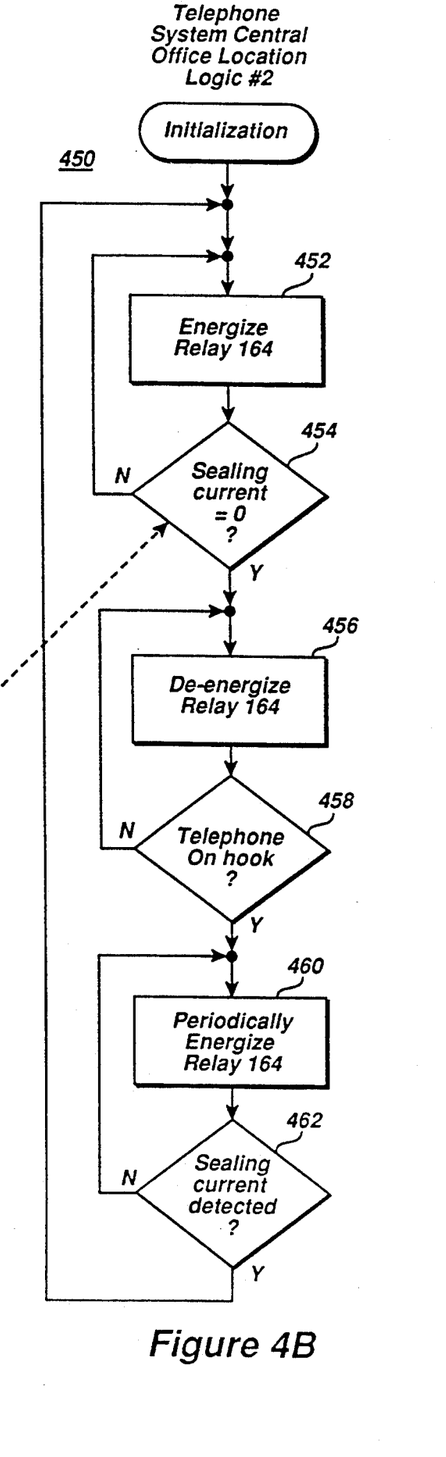

When power is lost at the subscriber location 106, and transformer 114 is switched out of the telephone loop, the power fail condition is remotely detected at the telephone system central office 108 by sealing current detector 122. Since transformer 114 has been switched out of the loop, the sealing current source 124 is lost and the sealing current drops to zero. This change is detected at decision 454 by sealing current detector 122. When the sealing current detector 122 detects the drop in sealing current, the logic output of sealing current detector 122 changes state. When the logic output of sealing current detector 122 changes state, logic circuit 166 de-energizes relay coil 164 at step 456, thus coupling voice switch 30 directly to telephone lien 110 through switch 156, loop current detector 168 and switch 148, and to telephone line 112 through switches 154, 162.

If power has been restored as determined at decision 408 and the telephone device is on-hook at decision 410 as indicated by loop current detector 146, logic circuit 144 re-energizes relay 142, as indicated in step 402. At the same time, logic circuit 166 determines whether the telephone system 24 is on-hook, as determined at decision 458 by checking the output of loop current detector 168. If telephone device 24 is on-hook, logic circuit 166 periodically energized relay 164 at step 460 to determine whether sealing current is flowing at decision 462, in particular by sensing the output of sealing current detector 122. If sealing current is detected, logic circuit 166 energizes relay 164 to return the system 100 to its normal state at step 452.

Figure 3:
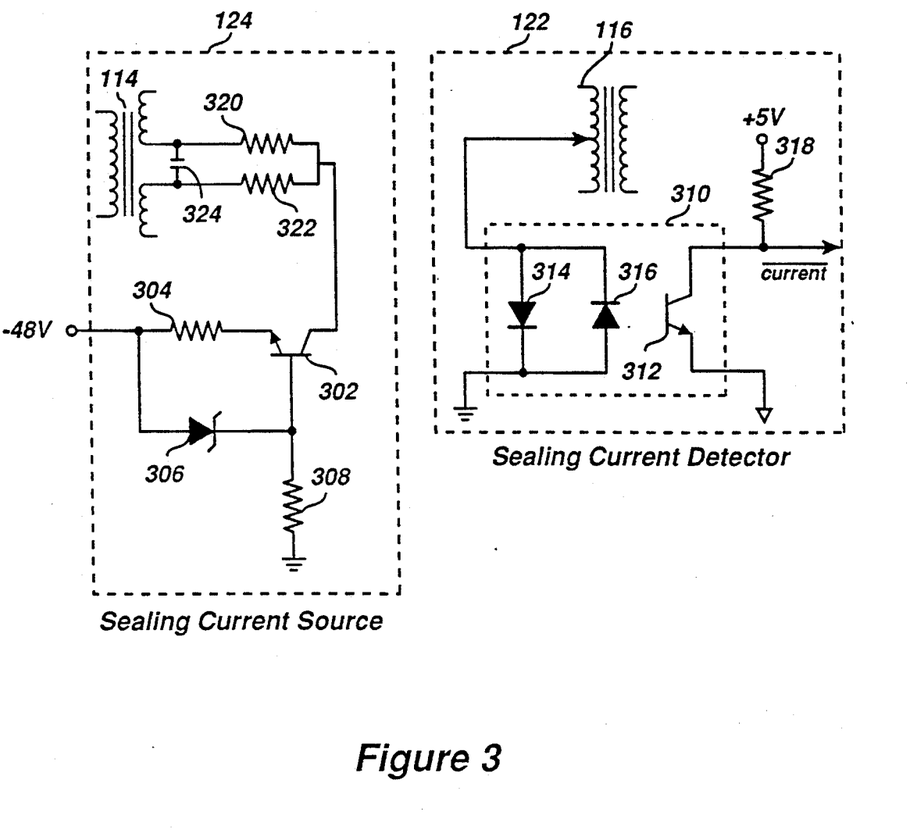
FIG. 3 is a schematic diagram of the sealing current source and sealing current detector described in conjunction with FIG. 2.

Referring now to FIG. 3, the sealing current source 124 and the sealing current detector 122 are shown in schematic form. The sealing current source 124 as shown is based on an NPN transistor 302 having an emitter coupled to a negative voltage such as a 48 volt power source through resistor 304. The negative 48 volt power source may be of the type available in most conventional ISDN modem systems. The base of transistor 302 is coupled to ground through resistor 308. Voltage limiting (Zener) diode 306 is coupled across the base-emitter junction of transistor 302. Resistor 304 and diode 306 are selected to provide a current capacity of approximately 10 mA through sealing current source 124.

Resistors' 320 and 322 in series with the sealing current source path assure that the sealing current divides evenly between the two windings of transformers 114 to prevent saturation. In addition after a condition of power failure when power is restored at the subscriber end, these resistors limit the current that transformer 114 would normally drain from the central office loop since the central end is still bypassed until ISDN operation is established. This prevents false off-hook detection by loop current detector 168.

Capacitor 324 bypasses resistors' 320, 322 for ISDN transmission signals so no AC losses are incurred. The sealing current detector 122 comprises a conventional optical isolator 310 having an output transistor 312 and an isolated input, formed by cross-coupled light emitting diodes 314, 316, coupled to the centertap terminal of transformer 116. The other terminal of cross-coupled light emitting diodes 314, 316 is coupled to the collector of current source transistor 302, wherein whenever current flows into the centertap terminal of transformer 116, through cross-coupled light emitting diodes, to ground, the collector of transistor 312 is driven low, thus indicating the presence of sealing current. In the absence of sealing current, the collector of transistor 312 is pulled high by resistor 318.

In summary, an improved system for maintaining voice communication in an ISDN modem system has been described. Accordingly, other uses and modifications of the present invention will be apparent to persons of ordinary skill and all of such uses and modifications are intended to fall within the scope of the appended claims.

We claim:

1. An improved system for maintaining voice communications in a voice and data communications system, said system comprising:

first and second voice and data modem means disposed at a subscriber location and a central office location, respectively, wherein each of said respective voice and data modem means include voice and data input means and output means;

first and second transformer means for coupling the output means of said respective first and second modem means to telephone lines, said first and second transformer means each including a winding having a centertap terminal, the centertap terminal of said first transformer means being split and coupled to a sealing current source and the centertap terminal of said second transformer means being coupled to ground;

means for detecting a power failure at said subscriber location; and, means for bypassing said first and second voice and data modem means and said first and second transformer means upon detecting power failure at said subscriber location.

2. The system of claim 1, wherein a sealing current detector is coupled between ground and the centertap terminal of said second transformer means.

3. The system of claim 2, wherein a power failure at said subscriber location is detected by a lack of sealing current flowing between said first and second transformer means as indicated by said sealing current detector.

4. An improved method for maintaining voice communications in a voice and data communications system, said method comprising:
   disposing first and second voice and data modem means at a subscriber location and a central office location, respectively;
   coupling said respective first and second modem means to telephone lines with first and second transformer means wherein each of said transformer means include a winding having a centertap terminal, said centertap terminal of said first transformer means being split;
   detecting a power failure at said subscriber location; and
   bypassing said first and second voice and data modem means and said first and second transformer means upon detecting power failure at said subscriber location.

5. The method of claim 4, further comprising the step of coupling the split centertap terminal of said first transformer means to a sealing current source and coupling the centertap terminal of said second transformer means to ground.

6. The method of claim 5, further comprising the step of coupling a sealing current detector between ground and the centertap terminal of said second transformer means.

7. The method of claim 4, further comprising the step of coupling voice telephone means to the voice input of said first modem means and a voice switch to the voice input of said second modem means.

8. The method of claim 7, further comprising the step of coupling first and second loop current detector means in series with said telephone means and said voice switch means to detect whether said telephone means is on-hook.

9. The method of claim 8, further comprising the step of coupling said telephone means and said voice switch to said telephone lines upon detecting a power failure at said subscriber location and coupling said telephone means and said voice switch means to the voice inputs of said first and second modem means upon detecting that said telephone means is on-hook and power has been restored at said subscriber location.

10. An improved system for maintaining voice communication in an ISDN modem system under power fail conditions, said system comprising:
   subscriber location ISDN modem means, said subscriber location ISDN modem means having an output interface comprising a transformer having a split center-tap terminal and sealing current source, a first input interface coupled to a voice telephone device with first selective coupling means and a second input interface coupled to a data terminal;
   means for coupling said subscriber location output interface to telephone lines with second selective coupling means;
   first detecting means for detecting whether said telephone device is on-hook;
   subscriber location logic means for actuating said first and second selective coupling means to de-couple said telephone means from said first input interface and to couple said telephone means to said telephone lines and to de-couple said output interface from said telephone lines when a subscriber location power failure occurs, said logic means including means for detecting the return of power to said subscriber location and for actuating said first and second coupling means to couple said telephone means to said first input interface and to couple said output interface to said telephone lines when power is detected and when said first detecting means indicates said telephone device is on-hook;
   telephone system central office ISDN modem means, said telephone system central office ISDN modem including an output interface means comprising a transformer having a centertap terminal coupled to a sealing current detector, a first input interface coupled to a voice switch with a third selective coupling means and a second input interface coupled to a data processing device;
   means for coupling said telephone system central office location output interface to telephone lines with fourth selective coupling means;
   second detecting means for detecting whether said telephone device is on-hook; and
   telephone system central office location logic means having an input coupled to said sealing current detector means, for actuating said third and fourth selective coupling means to de-couple said voice switch means from said first input interface of said telephone system central office ISDN modem and to couple said voice switch means to telephone lines and to de-couple said output interface from said telephone lines when a subscriber location power failure occurs as indicated by said sealing current detector means, said logic means including means for actuating said third and fourth coupling means to couple said voice switch means to said first input interface to said telephone system central office ISDN modem and to couple said output interface to said telephone lines when sealing current is detected and when said second detecting means indicates said telephone device is on-hook.

* * * * *

UNITED STATES PATENT AND TRADEMARK OFFICE
CERTIFICATE OF CORRECTION

PATENT NO. : 5,216,704

DATED : June 1, 1993

INVENTOR(S) : Arthur B. Williams and David T. Lundquist

It is certified that error appears in the above-identified patent and that said Letters Patent is hereby corrected as shown below:

Column 6, line 7, delete "12" and insert --112--.

Column 7, line 6, delete "as" and insert --at--.

Column 7, line 28, delete "ar" and insert --are--.

Column 7, line 44, change "lien" to read --line--.

Column 7, line 56, "energized" should read --energizes--.

Signed and Sealed this

Eighth Day of February, 1994

Attest:

BRUCE LEHMAN

*Attesting Officer*     *Commissioner of Patents and Trademarks*